(12) United States Patent
Tsai

(10) Patent No.: US 6,775,557 B2
(45) Date of Patent: Aug. 10, 2004

(54) TELEPHONE METHOD AND APPARATUS

(75) Inventor: Irving Tsai, New York, NY (US)

(73) Assignee: Mary Y. Tsai, New York City, NY (US)

( * ) Notice: Subject to any disclaimer, the term of this patent is extended or adjusted under 35 U.S.C. 154(b) by 484 days.

(21) Appl. No.: 09/848,836

(22) Filed: May 5, 2001

(65) Prior Publication Data

US 2001/0036839 A1 Nov. 1, 2001

Related U.S. Application Data

(60) Provisional application No. 60/202,692, filed on May 8, 2000.

(51) Int. Cl.[7] .............................. H04Q 7/20; H04K 1/00
(52) U.S. Cl. ................................ 455/556.1; 455/556.2; 455/412.1; 455/413; 380/247; 380/252; 713/176
(58) Field of Search ........................... 455/556.1, 556.2, 455/412.1, 413, 411; 380/252, 247; 713/176

(56) References Cited

U.S. PATENT DOCUMENTS

2002/0034297 A1 * 3/2002 Rhoads ........................ 380/247

* cited by examiner

Primary Examiner—Nay Maung
Assistant Examiner—Alan T. Gantt

(57) ABSTRACT

A telephone and telephone answering apparatus and method are described for using secondary information embedded in audio passages included in phone calls. The telephone and telephone answering device monitors received calls to automatically detect for the presence of embedded secondary information. Some embodiments merely receive, automatically monitor for the presence of, and use secondary information. Other embodiments are also capable of generating and of embedding secondary information into audio passages.

2 Claims, 10 Drawing Sheets

TELEPHONE METHOD AND APPARATUS

The present application claims the benefit of U.S. Provisional Application Serial No. 60/202,692 whose filing date was May 8, 2000.

BACKGROUND OF THE INVENTION

1. Field of the Invention

The present invention relates to a novel telephone and telephone answering apparatus and method capable of using secondary information. The secondary information may comprise data, executable instructions, electronic addresses, scripting laguages, as well as audio or video information. Although not limited thereto, one embodiment of the present invention makes use of techniques known in the art of data hiding, steganography, and audio watermarking to embed the secondary information into audio passages.

2. Description of Related Art

Techniques are known in the art for communicating more than one type of information within a single phone call. For example, simultaneous voice-data modems permit data to be transmitted and voice conversations to be carried on, at the same time during a single call. However, within the SVD (simultaneous voice/data) technical art it would not be possible to "deposit" data into the message store of a conventional telephone answering machine, in such manner that the data can be concurrently saved alongside the voice message recorded in the answering machine memory. Further, it would not be possible to accomplish this without even having any knowledge of the type of answering machine involved. Still further, there is no teaching in the current art as to how secondary data might be "deposited" into a conventional telephone answering machine that was designed to do nothing beyond recording voice messages, and then later be retrieved. There is also no teaching in the current art of telephone answering devices capable of automatically "listening in" for and of utilizing information, for example, steganographically embedded in the telephone call.

SUMMARY OF THE INVENTION

The present invention relates to a telephone and to a telephone answering device capable of using secondary information. More generally, the present invention is directed at a method and apparatus for receiving and for making telephone calls containing secondary information. The secondary information may comprise data, executable content, audio or video information; and calls communicated containing such secondary information may be referred to as being in (RCF) Rich Call Format. In one embodiment of the invention, the telephone or telephone answering device is capable only of receiving, of using, and of forwarding information received in Rich Call Format. In another embodiment of the invention, the telephone or telephone answering device can additionally encode secondary information for transmission to another location, and thus, of originating the placement of Rich Call Formatted calls. It is an object of the present invention is to furnish a method and apparatus for using secondary information in Rich Call Formatted calls in a manner that is backwards compatible and fully interoperable with existing art telephony equipment and methods. For example, RCF phone calls made to current art telephones should be receivable and appear substantially the same as ordinary phone calls. Similarly, RCF phone calls made to existing art telephone answering machines should permit Rich Call Formatted phone messages to be "deposited" in the existing art answering machines, such that, although the existing art answering devices would not be able to use the enhanced capabilities afforded by the present invention, they would still be receivable and appear substantially the same as ordinary phone messages. Moreover, an RCF-capable phone or answering machine would later be able to retrieve any RCF messages deposited into any answering device or voice mail box, whether or not that intermediate answering device or mail box was itself RCF-capable, and subsequently make use of the enhanced services afforded by the present invention.

Although by no means limited thereto, the present invention draws on techniques well established in the art of data hiding, steganography, and audio watermarking to embed secondary information in audio passages. Whereas the aforementioned technical arts aspire to place data within a host or carrier in a manner substantially perceptually invisible to the user of the processed information, the present invention desires only that the secondary information be unobtrusively presented to the user. Ideally, it is preferred that the steganographic asymptote of substantially invisible encoding be achieved, for communicating secondary information to the user. But this is not a requirement of the present invention.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention. The scope of the invention is best defined by the appended claims.

Figure 1:
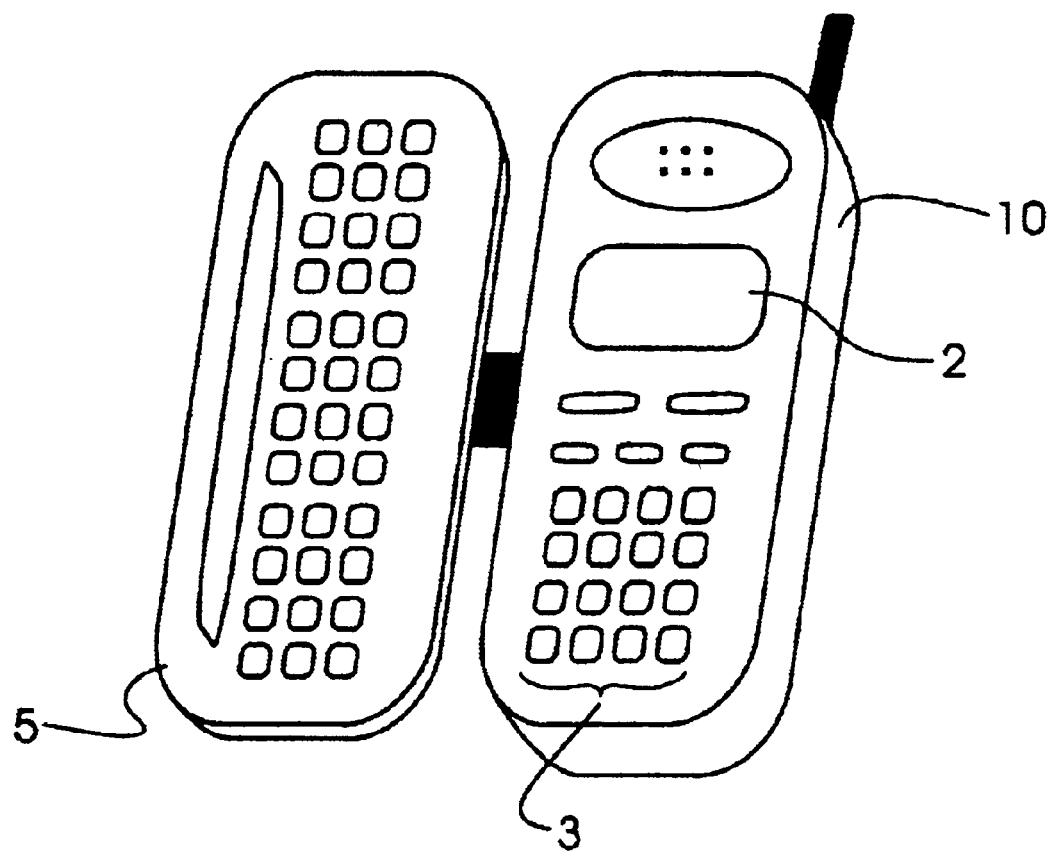
FIG. 1 shows a cellular telephone having means for receiving and for sending secondary information.

FIG. 1 shows a cellular telephone 10 having means for receiving and for sending secondary information. The cell phone 10 includes a dial pad 3 used typically for entering telephone numbers, and a display screen 2 for displaying information. Cell phone 10 is also shown with a keyboard 5 in FIG. 1. Keyboard 5 is depicted as attached to the body of cell phone 10 as a lid, permitting the keyboard and body of the phone to be closable in a clam-shell fashion. This configuration is for illustrative purposes only, and the invention is not in any way restricted by the specific manner in which a keyboard is provided to the cell phone. For instance, keyboard functionality may be furnished by the dial pad 3; or, the display means 2, in embodiments in which it has touch sensor capability, may itself supply keyboard function in the form of a virtual keyboard. These possibilities are appreciated by persons skilled in the art. In accordance with the present invention, cell phone 10 is capable of receiving and of using secondary information that has been embedded in an audio host, and received by cell phone 10. This use of secondary information may take place while a call is in progress, or after a call has terminated. Cell phone 10 monitors, or "listens in" on the call in progress. The audio signal is sampled for the presence of embedded information. When embedded information is detected, it is extracted. The process may involve caching, or temporarily storing, portions of the audio stream to be processed. The entire call, or a large portion of the audio stream constituting the call, may also be stored first, to be processed later. Techniques for accomplishing this, of encoding and decoding embedded data in a host, and of sampling to detect the presence of embedded data are well known in the steganographic and audio watermarking art, and are understood by persons skilled in these fields. Extracted secondary information may be displayed on display means 2 and/or played over the phone's speaker. Extracted secondary information may comprise text, web pages, URL's, virtual machine language code or other executable content, scripts, audio or video data, still or moving images, as well as any type of information data may be known in the art to encode for. Also, whereas FIG. 1 illustrates the principle of the present invention using a cellular telephone, the invention is not limited to this case, and also embraces desktop wired telephone equipment.

Figure 2:
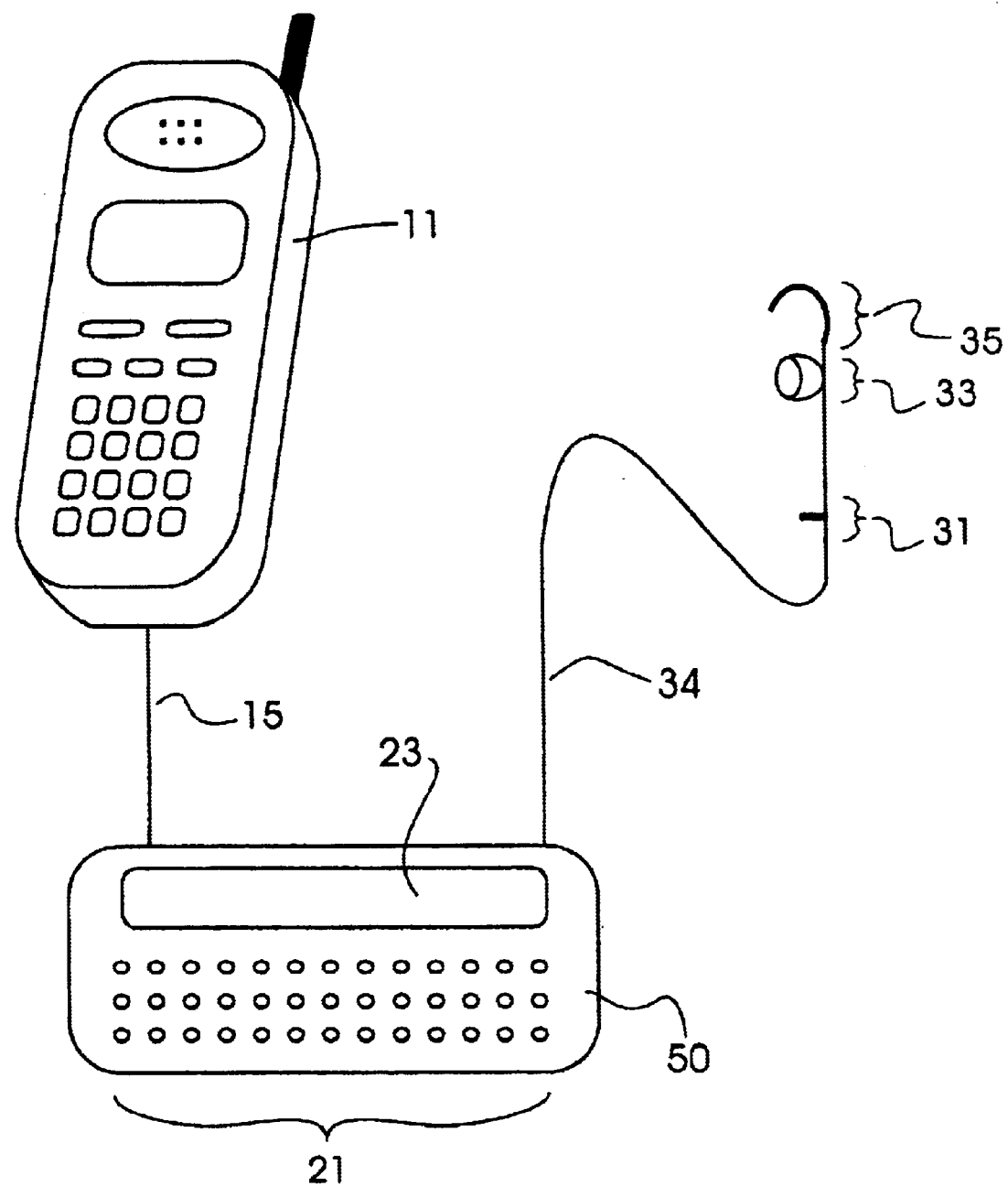
FIG. 2 shows an apparatus operatively connectable to a conventional cell phone for enabling that cell phone to send, receive, and to make use of secondary information in accordance with the present invention.

FIG. 2 illustrates a cell phone 11 that does not itself have the ability to send or receive secondary information. Cell phone 11 is therefore typical of current art cellular phone equipment. Unit 50 represents an apparatus operatively connectable to cell phone 11 for enabling cell phone 11 to send, receive, and to make use of secondary information in accordance with the present invention. Cable 15 connects unit 50 to phone 11, such as via the 2.5 millimeter jack supplied on phone 11 for use with "hands free headsets". A "hands free headsets" is illustrated in FIG. 2. Rather than being connected directly into telephone 11 as is customary, it is shown connected to unit 50 via cable 34. An earphone is shown as 33. 31 represents a microphone; and 35 is an over-the-ear clip for supporting the headset assembly. Unit 50 includes a keyboard 21 for alphanumeric and symbolic data entry, and a display means 23 for displaying information. Because unit 50 is attached to cell phone 11 via the headset port of the phone, unit 50 is able to monitor the audio stream received by and sent from cell phone 11. Unit 50 thus "listens in" on calls placed and received by the cell phone 11. A user is able to talk using the hands-free headset connected to unit 50 via cable 34. The audio information travelling into earphone 33 and into and out of microphone 31 passes through cable 34 into unit 50, and through cable 15 from unit 50 into cell phone 11. Secondary information that has been embedded in an audio host, and communicated to cell phone 11, for example by cell phone 10 which capable of originating and of placing Rich Call Formatted calls, can be extracted by unit 50. The extracted information can be displayed on screen 23. Keyboard 21 may be used to input data that is to be embedded in an audio host, for communication to another device that possesses the means to make use of such secondary information; for example, cell phone 10 of FIG. 1 or cell phone 11 of FIG. 2 with unit 50 attached.

Figure 3:
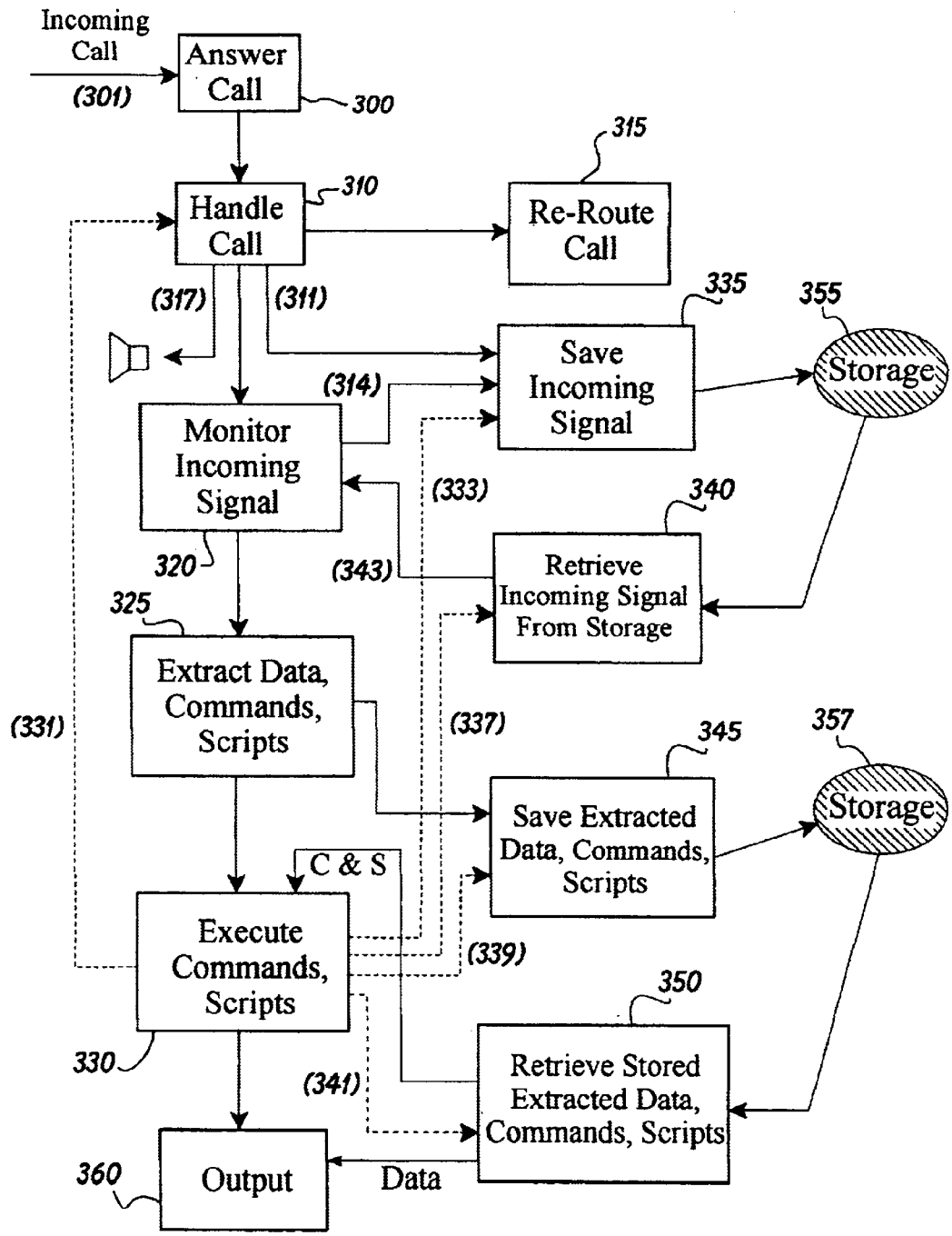
FIG. 3 shows the process steps of the present invention.

FIG. 3 diagrams the process steps of the present invention. When an incoming call 301 is received, such as by phone 10 of FIG. 1, or by answering machine 100 of FIG. 6, or phone 11 of FIG. 2, the call is answered 300, and then the incoming signal comprising the call is said to be handled 310. By handling the call, it is meant that the call may be connected directly 317 to the mouth piece and hearing piece of phone 10; or to microphone 31 and earphone 33 of phone 11; or else to speakerphone 102 of answering machine 100. The incoming signal comprising the call may also be directly 311 saved 335 in a storage means 355, as is the familiar procedure for an answering machine. The incoming call may also be re-routed 315 to another device. The incoming signal comprising the call may also be monitored 320, to detect for the presence of secondary information embedded in the signal. Therefore, the call may be monitored as it is being sent 314 to storage, in contrast to simply being directly 311 sent to storage. When the call is monitored 320, it is sampled to detect for the presence of embedded secondary information in a manner well known in the art of steganography and audio watermarking. Portions of the information signal may be temporarily stored, or cached, to facilitate processing, whether or not the entire signal stream is saved. When embedded secondary information is detected, it is extracted 325. Techniques for detecting, encoding, and extracting information embedded in a host or carrier are fundamental to the science of steganography and audio watermarking, and these considerations are readily understood by persons skilled in the art. The extracted secondary information, which may comprise data, commands, scripts, etc. may be saved 345 in a storage means 357. They may also be executed 330, or formatted for output 360. Extracted commands and scripts may control: how an incoming call is handled 331; how an incoming signal is to be saved 333; how an incoming signal that has previously been saved is retrieved for processing 337; how secondary information that has been extracted is saved 339; or how secondary information extracted and saved earlier is retrieved 341.

Figure 4:
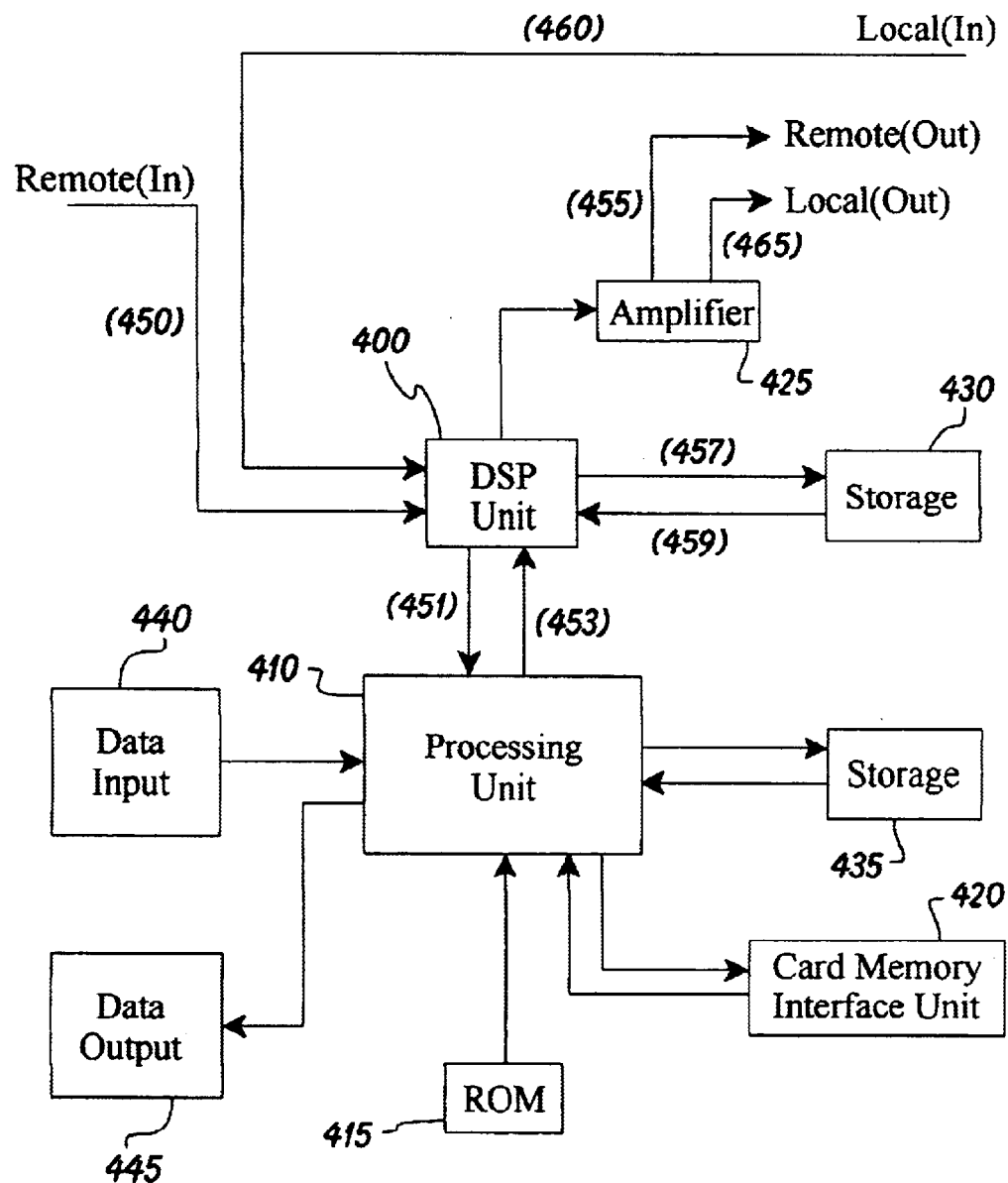
FIG. 4 shows a schematic of how the external Sound Byte Processor of FIG. 2 is in operational communications with cell phone 11 and the hands-free headset
Figure 6:
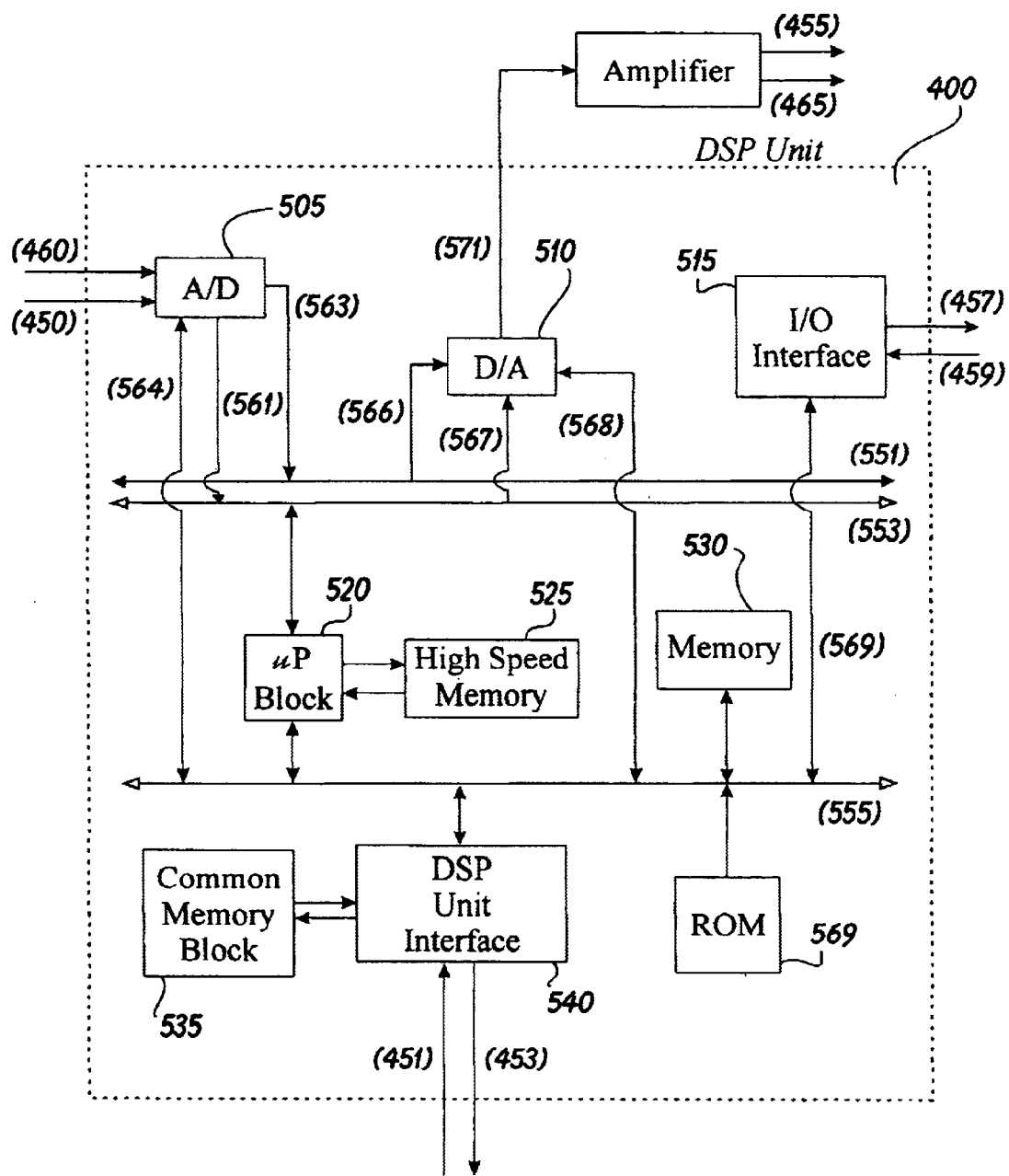
FIG. 6 shows components internal to DSP Unit 400.

FIG. 4 shows how the external Sound Byte Processor (SBP) 50 of FIG. 2 is in operational communications with cell phone 11 and the hands-free headset. The audio signal from cell phone 11 is passed to a (DSP) Digital Signal Processing unit 400 via Remote(In) line 450. Cable 15 supplies the external electrical connection between Sound Byte Processor 50 and cell phone 11. The output signal from SBP 50, namely Remote(Out) 455, goes to cell phone 11 for transmission to another telephonic location. The signal from microphone 31, carried by cable 34, travels into DSP Unit 400 via the Local(In) line 460. Similarly, the audio output of SBP 50 to earpiece 33 is shown as Local(Out) 465. DSP Unit 400 supplies the signal processing means to monitor an incoming call received by cell phone 11, and which has been input to DSP Unit 400 via Remote(In) line 450, for secondary information. The secondary information has been embedded using steganographic and audio watermarking techniques known in the art. FIG. 6 illustrates an exploded view of components internal to the DSP Unit 400.

In FIG. 6, Remote(In) Signal 450 entering DSP Unit 400 of Sound Byte Processor (SBP) 50 is fed to analog to digital conversion unit (A/D) 505. The analog audio signal is placed on Analog Bus Line 551 via line 563. The digital representation of the analog signal is placed on secondary digital audio bus 553 via line 561. Microprocessor Unit 520 takes the stream of digital data representative of the audio signal from bus 553, and processes it in accordance with principles known in the art of steganography and audio watermarking, to detect and extract secondary information embedded within the audio signal. High speed memory unit 525 is provided to facilitate processing and can serve as a cache memory for portions of the digitized audio stream. Although not shown for purposes of simplification, A/D Unit 505 also contains a memory unit of its own. Microprocessor block 520 can talk to A/D Unit 505 via primary bus 555 to request, or fetch, data contained in the A/D unit's proprietary memory. A data fetch request sent to A/D Unit 505 causes the requested data to be placed onto bus 553 via line 561. It is then accessible to the Microprocessor block 520. Extracted secondary information can be placed into memory unit 530 via DSP unit's primary bus, 555. Interface unit 540, using primary bus 555, accesses information in memory 530, and can send the information via line 451 to processing unit 410. Interface unit 540 also possesses access to a common memory block 535 into which data, such as extracted secondary information, can be stored. As skilled artisans would recognize, the kind of compartmentalization employed permits parallel processing to occur. For example, signal processing, secondary information processing, and secondary information handling and execution can occur in parallel.

Processing unit 410 handles and executes commands, scripts, and data contained in the secondary information. For example, processing unit 410 can execute virtual machine language commands; it can interpret scripts such as VB-script or JAVA script; and can process HTML information. Unit 410 may also pass data to output processing unit 445 which can provide hardware implementations of data formats such as MPEG or MP3. These concepts are well understood by skilled artisans.

Figure 5:
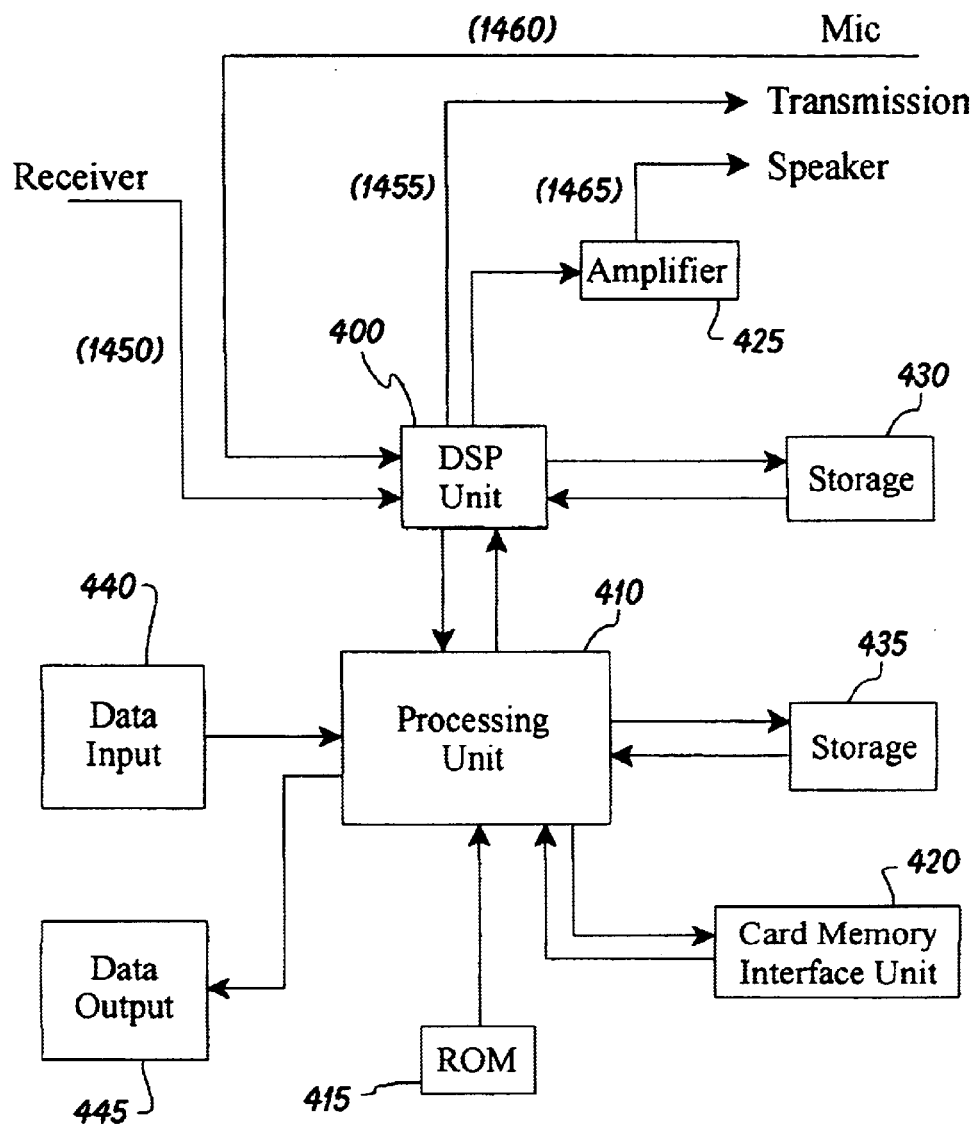
FIG. 5 shows schematic of a cell phone having means to use embedded secondary information without the need for connection to an external sound byte processor.

Secondary information may be embedded for transmission to another location by the Sound Byte Processor 50. As illustrated in FIG. 2 SBP 50 is equipped with a keyboard 21. Keyboard input is sent to Input Processor 440, which forwards the character codes entered from the keyboard to the Processing Unit 410, which runs the software application that uses the data input from keyboard 21. Processing Unit 410 passes the data to be embedded in an audio carrier using steganographic or audio watermarking techniques to the DSP Interface Unit 540; DSP Interface Unit 540 may store this data in common memory block 535. Interface unit 540 prepares the data stored in memory block 535 for embedding in the audio host. Microprocessor block 520 embeds the data and passes the data representative of the host containing the embedded secondary information to the Digital to Analog Conversion Unit (A/D) 510, via bus 553. D/A Unit 510 is in operational communications with the Microprocessor Block 520 and the Interface Unit 540, via primary bus 555. The analog signal output by D/A Unit 510 is amplified by amplification unit 425, and by way of the Remote(Out) line 455, the analog audio signals containing the embedded secondary information are communicated to cell phone 11, via electrical cable 15. Cell phone 11 can then transmit the audio passage having the secondary information embedded in it, as it would any other audio passage that has been input from either the microphone of cell phone 11, or input from the microphone of the hands-free headset connected to cell phone 11. As depicted in FIG. 5, with a cell phone such as cell phone 10 of FIG. 1 which possesses the integrated means to use embedded secondary information without the need for connection to an external sound byte processor such as SBP 50, the transmission unit of cell phone 10 is not connected to amplification unit 425, but is connected directly via line 1455 to DSP unit 400. This is because the transmission unit of cell phone 10 has direct access to bus 553, as well as to buses 551 and 555. The transmission unit of cell phone 10 has direct access to the digital data stream representative of the audio signal to be transmitted. This collective access of the transmission unit of cell phone 10 to buses 553, 551, and 555 is denoted as line 1455 in FIG. 5.

Figure 7A:
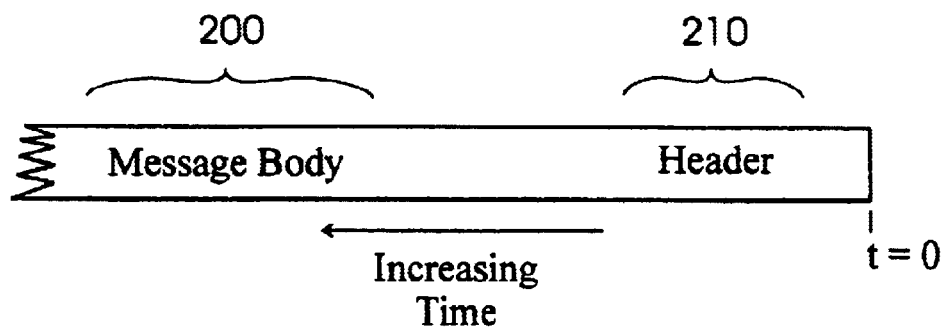
FIG. 7 shows how secondary information embedded in an audio host can be communicated in the form of a header or trailer.
Figure 7B:
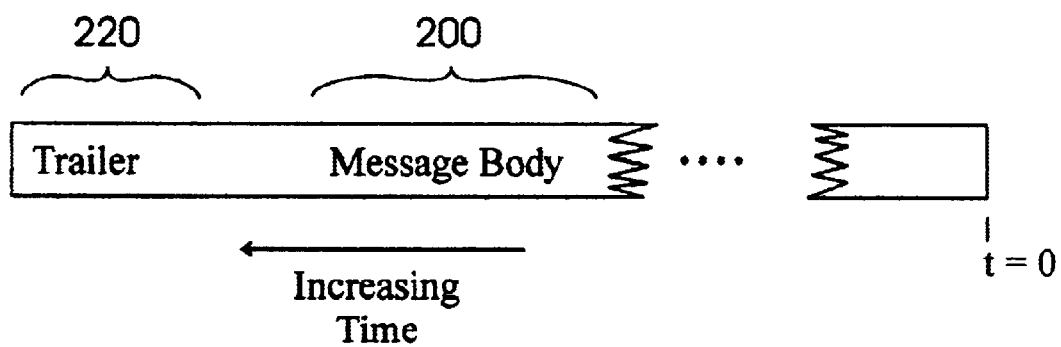

FIGS. 7(*a*) and 7(*b*) illustrate how secondary information embedded in an audio host can be communicated in the form of a header or trailer. With the present invention, secondary information is embedded in an audio carrier or host using methods known in the art of data hiding, steganography, or audio watermarking. The audio host may be the primary audio passage, such as the audio passage constituting the telephone conversation itself. In accordance with the present invention the carrier may also consist of a host signal supplied specifically to act as the carrier. Secondary information is then embedded in this supplied carrier, and the resultant audio passage having the just-embedded secondary information is then communicated along with the audio information comprising the actual telephone conversation. In FIG. 7(*a*) a scenario is depicted wherein the audio passage containing the embedded secondary information is communicated temporally ahead of the telephone conversation. The former is shown as Header 210 and the latter is depicted as the Message-Body 200. Header 210 is shown commencing at time t=0 to illustrate that it temporally precedes Message-Body 200. FIG. 7(*b*) shows a scenario wherein the audio passage containing the embedded secondary information is communicated temporally after the telephone conversation, as a trailer 220. In FIG. 7(*b*) the Message-Body 200 is shown commencing at time t=0 to illustrate that it temporally precedes trailer 220.

The supplied audio carrier can be in the form of a passage of music. Or, it can comprise a pre-recorded announcement. Equally, it can be in the form of what is often referred to as "white noise"; such as the sound of rain falling, or of the wind howling, or of a waterfall, or brook. Secondary information may be embedded into such audio hosts. After embedding, the already embedded carriers can be spliced into the communications stream as a header or trailer, as described earlier. The already embedded carriers may also be acoustically mixed with the primary audio passage (such as the conversation) to create a resultant audio passage that appears to be an ordinary phone conversation in a slightly noisy environment. For instance, to create a resultant audio passage that sounds like a conversation with background sounds like background music, or background conversation, or background noises like a waterfall, or wind, or rain, etc. This background "white noise", or course, is in actuality serving as a vector for embedded secondary information. In the case of an answering machine, the embedded secondary information, which may be content such as a link or the data comprising a personal web page, can be communicated to the caller who has reached the answering machine, during the OGM (Out Going Announcement); in addition to via a header or trailer.

Figure 8:
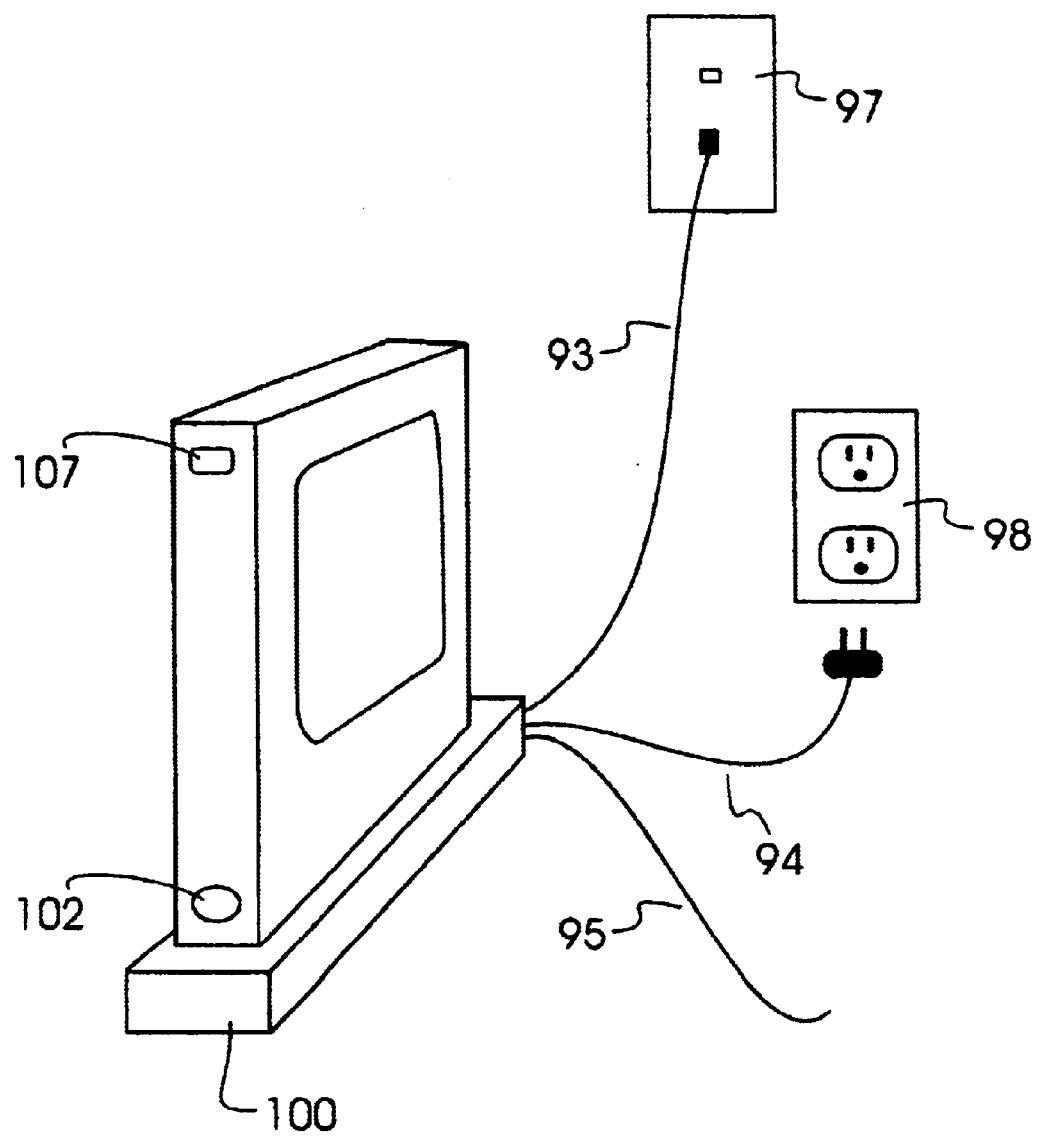
FIG. 8 shows one embodiment of a telephone answering device according to the present invention.

FIG. 8 shows an embodiment of a telephone answering device according to the present invention. The telephone answering device 100 includes a speaker 102, microphone 107 and display screen 106. Electrical cable 95 represents a data bus line for placing telephone answering device 100 in operational communications with networked appliances. Electrical cable 94 connects the answering device to power outlet 98, but also permits device 100 to maintain operational communications with networked appliances via signals sent and received through the home electrical wiring, for example, using techniques known in the art to the Home Plug Organization. Cable 93 connects the answering device 100 to telephone wall outlet 97, permitting telephone calls to be received as well as sent by device 100; but also permitting device 100 to talk to networked appliances via the home phone line wiring, for example, using techniques known in the art to the Home Phoneline Networking Association. Telephone Answering Device 100 operates in accordance with FIG. 3 through FIG. 6.

Figure 9:
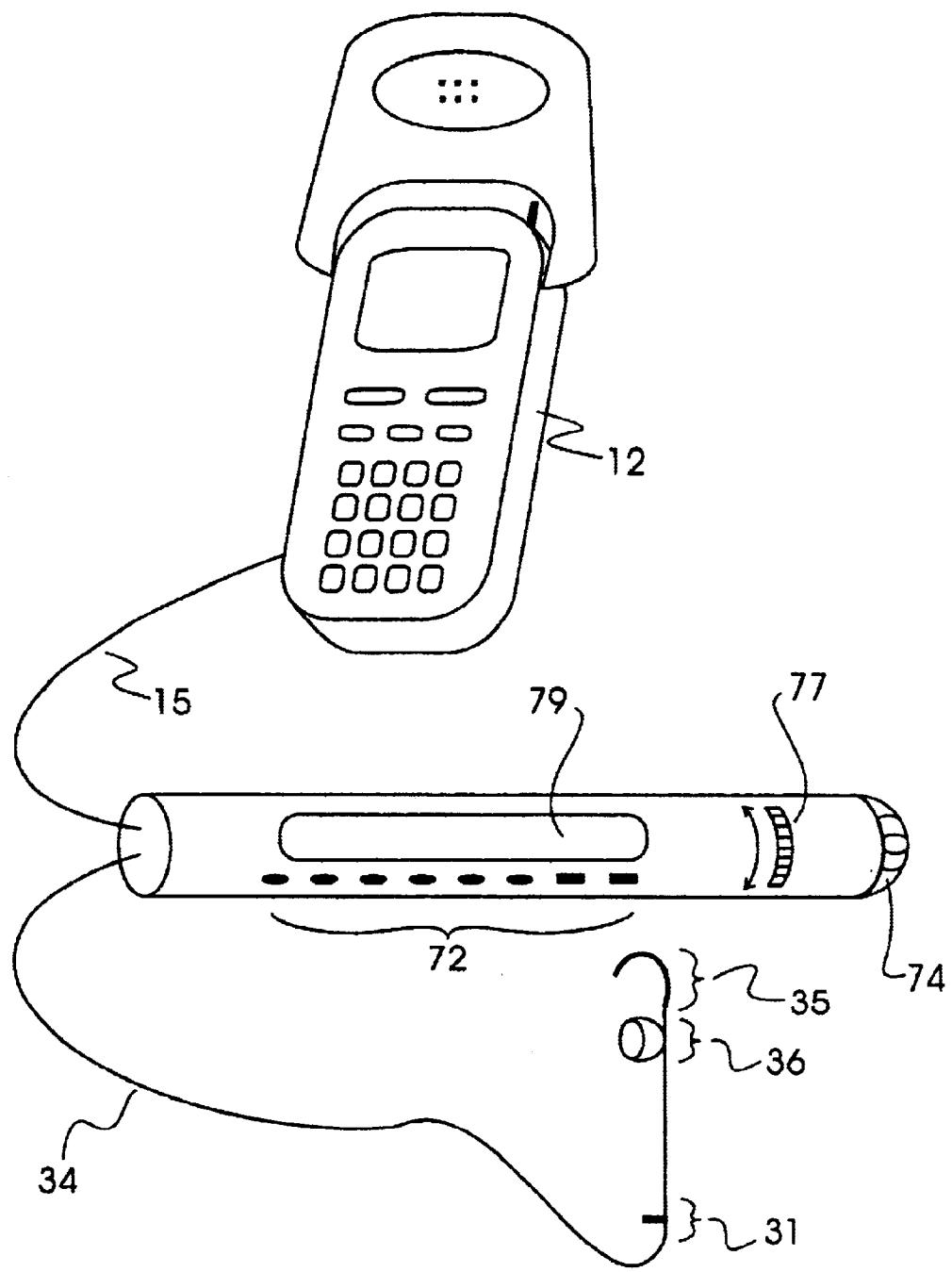
FIG. 9 shows an external Sound Byte adapter in the form of a "Roll Call" processor.

FIG. 9 shows an external Sound Byte adapter in the form of a "Roll Call" processor 70. Roll Call processor 70 operates in simplex mode, as it permits secondary information to be received, extracted, and used; but does not furnish means to embed new secondary information. A hands-free headset is shown, similar to the one illustrated in FIG. 2. Cell phone 12 is connected to the adapter via cable 15. A set of controls 72 permit the various functions of the Roll Call adapter 70 to be accessed. Display screen 79 is supplied to display text messages such as those of secondary information from calls received by phone 12 and extracted by adapter 70. Scroll knob 77 permits messages to be scrolled in the display screen 79. Speaker 74 is used to play audio passages received and stored in Roll Call adapter 70. Audio passages containing embedded secondary information can be played into the mouthpiece of pay telephones, or into the microphone of answering machines. This enables transfer of embedded content in audio passages in environments where it is impossible or inconvenient to cable a connection to the other device. It also facilitates the use of embedded content in audio passages as passwords, or as part of a dual component passcode. In a dual component dynamic passcode system, phone 12 can receive a single use passcode from some issuing authority. That single use passcode can be applied as one half of the full passcode, to enable the bearer of the codes access to some privilege. The audio passage containing the passcode can be played by speaker 74 of Roll Call processor 70 into the verifying device.

Figure 10:
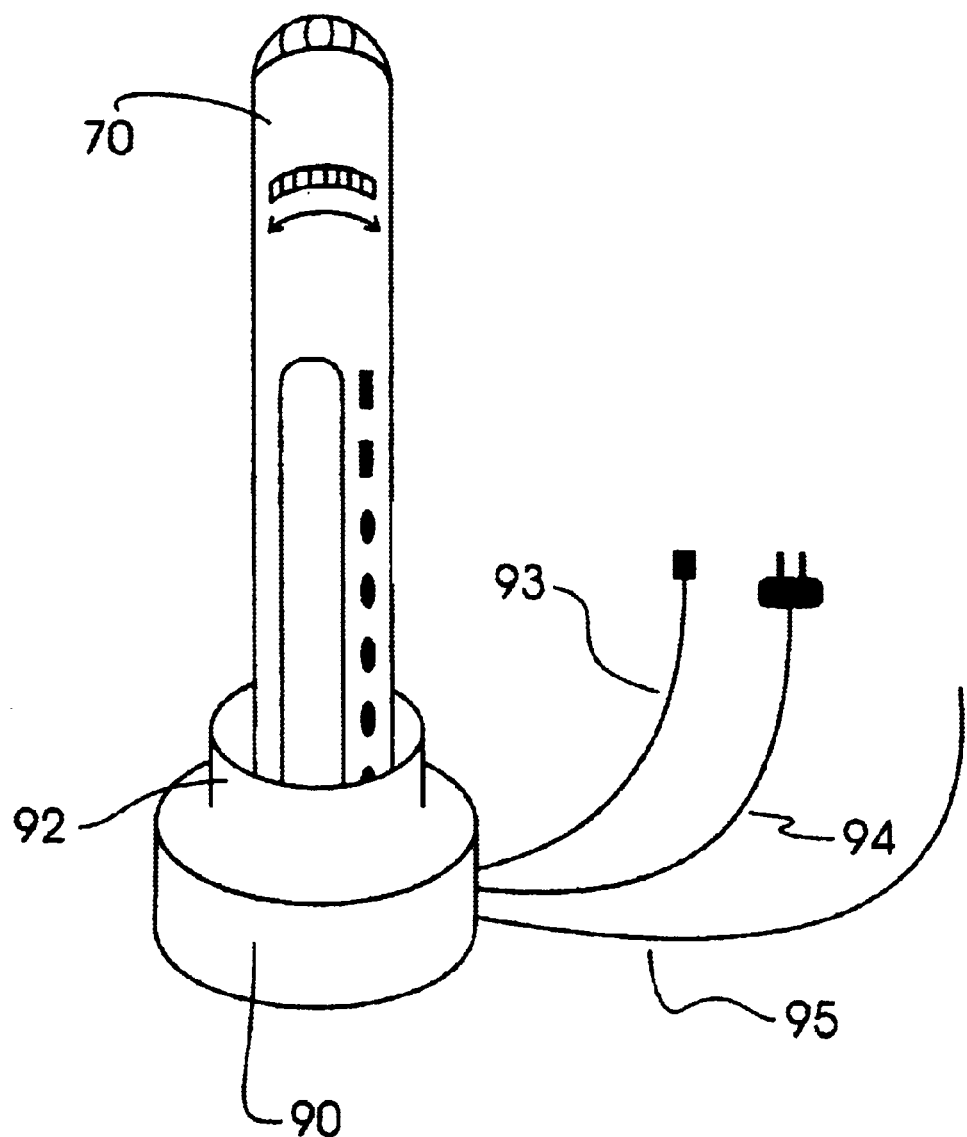
FIG. 10 shows shows a docking cradle having a docking port for receiving a Roll Call adapter.

FIG. 10 shows a docking cradle 90 having a docking port for receiving Roll Call adapter 70. The docking cradle furnishes battery charging services to adapter 70, as well as connections to phonelines 93, to electrical lines 94, and to computational networks 95. Phoneline 93 can provide networking access in accordance with principles known to the Home Phoneline Networking Association. Similarly, power connector 94 can provide networking access in accordance with principles known to the Home Plug Networking Organization. Roll Call adapter 70 can serve as an answering machine when docked in cradle 90. It can also furnish as well as share processing capabilities to and with other appliances linked via the network with which it is connected in the aforementioned ways.

I claim:

1. A telephone answering apparatus for using steganographically embedded information, comprising:

means for receiving a telephone call;

means for automatically answering the received telephone call;

means for automatically monitoring the answered, received telephone call for the presence of secondary information steganographically embedded therein; and means for extracting secondary information steganographically embedded in the telephone call.

2. An apparatus as in claim 1 including means for processing steganographically embedded secondary information extracted from the telephone call.

* * * * *